United States Patent [19]
McClymonds

[11] Patent Number: 5,375,398
[45] Date of Patent: Dec. 27, 1994

[54] MULTIPOSITION MOWING DEVICE

[76] Inventor: Dean L. McClymonds, 516 Wallace Run Rd., Beaver Falls, Pa. 15016

[21] Appl. No.: 192,579

[22] Filed: Feb. 7, 1994

[51] Int. Cl.⁵ ............................................. A01D 34/00
[52] U.S. Cl. ...................................... 56/15.2; 56/15.5
[58] Field of Search ........................... 56/14.7–15.2, 56/13.5–13.7, 16.7–17.3, 15.5, 6

[56] References Cited

U.S. PATENT DOCUMENTS

| | | | |
|---|---|---|---|
| 3,113,411 | 12/1963 | Hall | 56/25 |
| 4,802,327 | 2/1989 | Roberts | 56/15.2 |
| 4,869,056 | 9/1989 | Lynch | 56/15.2 |
| 4,887,417 | 12/1989 | Parsons, Jr. | 56/15.2 |
| 4,912,916 | 4/1990 | Parsons, Jr. | 56/15.2 |
| 5,076,042 | 12/1991 | Koorn et al. | 56/6 |
| 5,210,997 | 5/1993 | Mountcastle, Jr. | 56/15.5 |

Primary Examiner—Michael Powell Buiz
Attorney, Agent, or Firm—Gaca, Matis & Hamilton

[57] ABSTRACT

A vegetation cutting head is mounted on a tractor by an articulated boom. A hydraulic cylinder attached to the boom rotates the cutting head about an axis transverse to the distal end of the boom. A second hydraulic cylinder rotates the cutting head about an axis parallel to the plane of operation of the cutting head. A third hydraulic cylinder rotates the cutting head about an axis orthogonal to both of the first two axes. The cutting head can be operated while the boom is at any horizontal angle from 0° to 90° of the direction of travel of the tractor.

8 Claims, 10 Drawing Sheets

MULTIPOSITION MOWING DEVICE

BACKGROUND OF THE INVENTION

This inventions relates to boom mower attachments for tractors and, more particularly, to a curing head operable at varying distances and angles from the line of travel of the tractor to which it is attached.

It is well known to use a cutting head attached to a tractor by means of an articulated boom to mow gross and other vegetation along roads, railroad rights-of-way and the like. Such arrangements have been described, for example, in U.S. Pat. No. 5,210,997, U.S. Pat. No. 4,887,417 and U.S. Pat. No. 4,869,417. The articulated booms have generally been attached to the side of the tractor, as shown, for example, in U.S. Pat. No. 5,210,997, or to the rear as shown in U.S. Pat. No. 4,887,417. As is best illustrated in U.S. Pat. No. 5,210,997, such devices have often provided for movement through a wide range of angles in the plane normal to the line of travel of the tractor in order to cut over obstacles such as guard rails and also either to conform the plane of operation of the cutting head to the slope of the ground or to rotate the cutting head up for cutting tree branches and the like. However, prior devices have permitted the cutting head to move out of the plane normal to the line of travel of the tractor only when a tree or other obstruction has been struck (breakaway action) or when the cutting head is not in use. The restriction of operation to the plane normal to the line of travel of the tractor makes it difficult or impossible to bring the cutting head close enough to the tractor to cut inside the line of travel of the tractor wheels. As a result, when such a device is used to cut gross near the edge of a road, the tractor must be driven toward the center of the road, thus endangering the operator and other motorists.

SUMMARY OF THE INVENTION

In the present invention three hydraulically activated pistons are connected to a vegetation cutting head attached to a farm tractor by means of a rotatable articulated boom in such relation that, when the boom is operated out of the plane normal to the direction of travel of the tractor, the cutting head is provided three degrees of rotational freedom. In the preferred application of this invention, the rotatable articulated boom is attached to the front of a tractor designed for use with the engine to the rear of the operator. If the boom is so attached, the cutting head can be rotated as described while being operated at any point in the quadrant forward of the plane normal to the direction of travel.

An object of this invention is to provide for the attachment of a vegetation cutting head to a tractor by means of an articulated boom which can be rotated through the horizontal angle of at least 90° while the cutting head is in operation.

Another object of this invention is to provide means for adjusting the plane of operation of a vegetation cutting head to keep it parallel to the land being mowed.

A further object of this invention is to provide a vegetation cutting head having three degrees of rotational freedom with respect to the distal section of an articulated boom to which the cutting head is attached.

Yet another object of this invention is to provide a vegetation cutting head attached to a tractor by means of a rotatable articulated arm in such manner that the cutting head can cut vegetation inside the line of travel of the wheels of the tractor.

Still another object of this invention is to provide a vegetation cutting head that is attachable to a tractor by means of a rotatable articulated boom in such manner that the cutting head can easily be observed by the operator of the tractor while it is being used.

Still another object of this invention is to provide a device that will perform all of the functions of a conventional boom mounted mower while having improved mobility and being capable of operating within a smaller operating space, thereby providing a safer environment for both the equipment operator and the occupants of other vehicles in the vicinity.

Other objects and purposes of the invention will be clear from the description of the preferred embodiments.

DESCRIPTION OF THE PREFERRED EMBODIMENT

Figure 1:
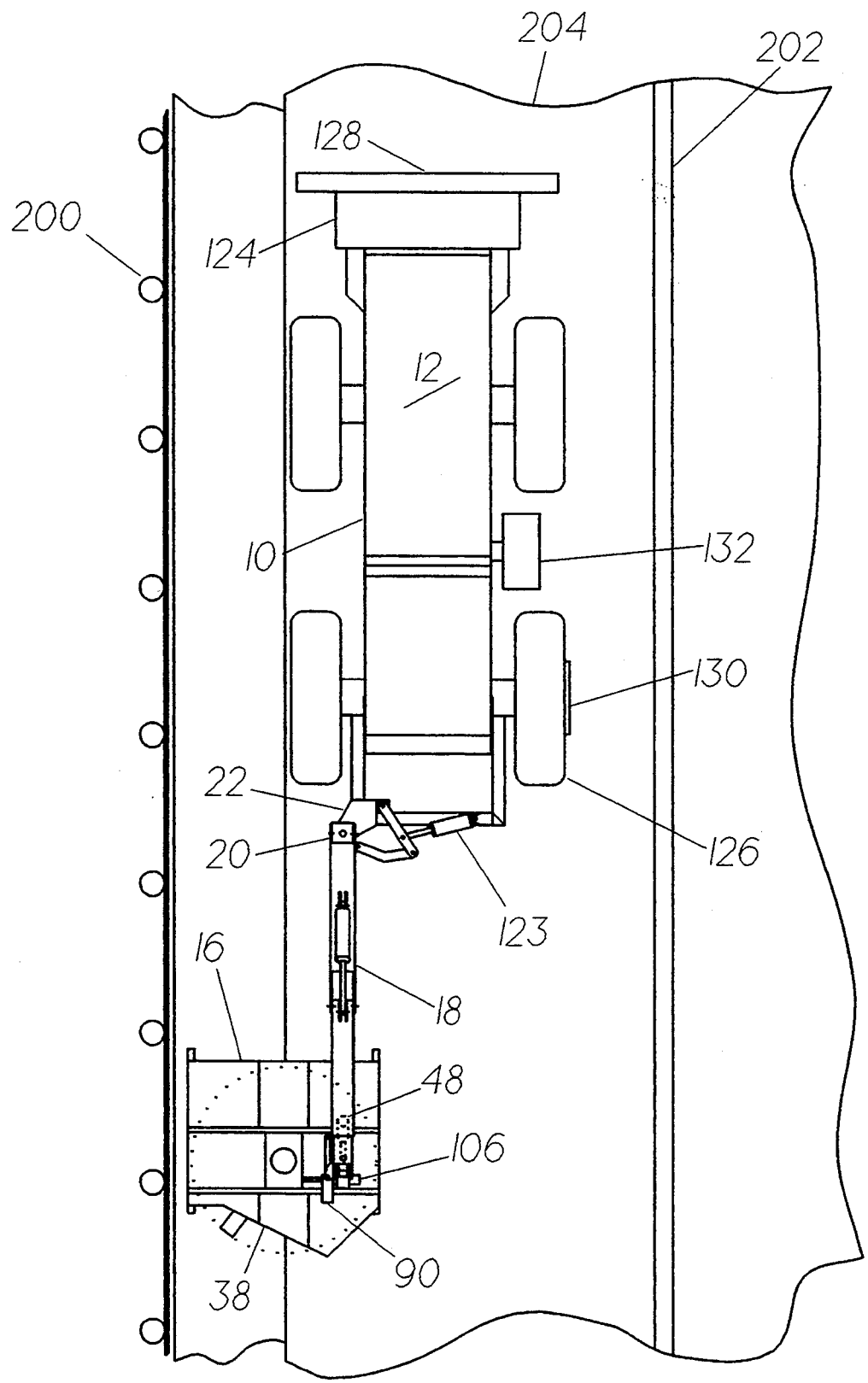
FIG. 1 is a plan view of a tractor with a rotatable boom and vegetation cutting head attached and with the boom parallel to the direction of travel.
Figure 2:
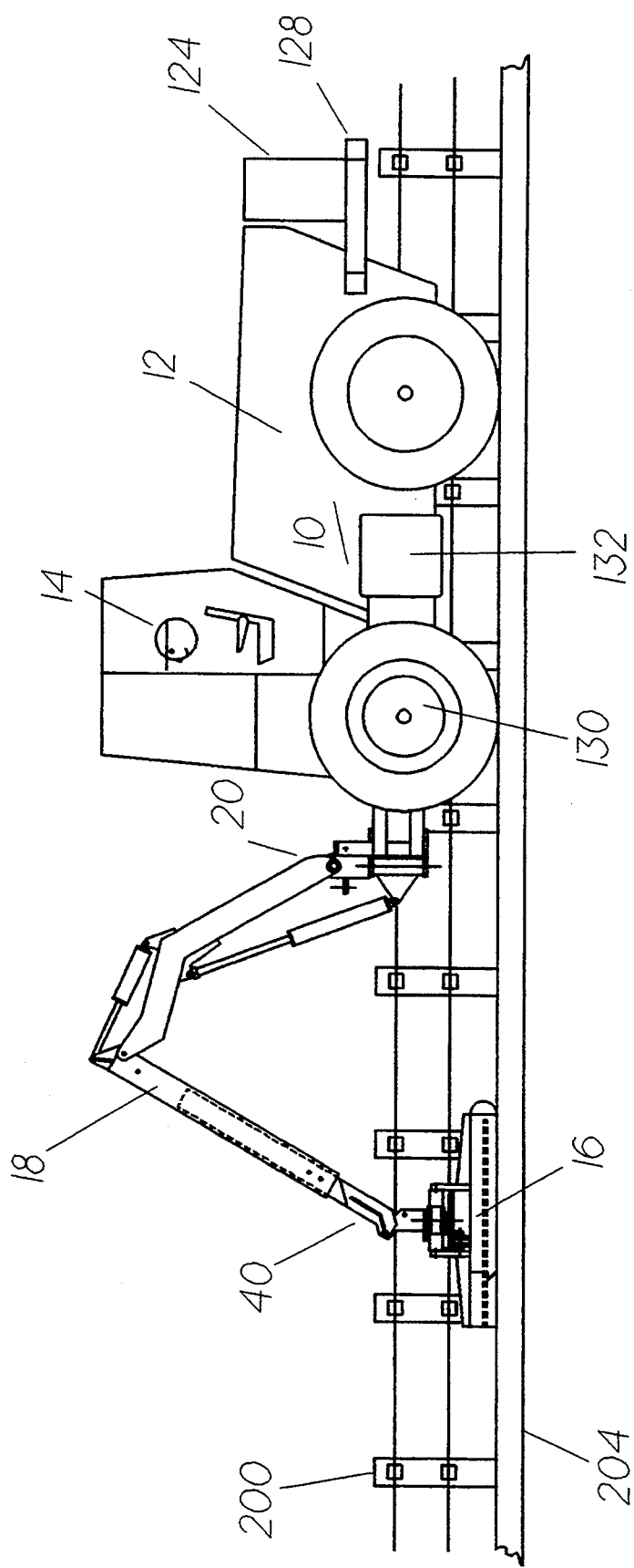
FIG. 2 is a side elevation view of the tractor and mowing device of FIG. 1.

Referring to the drawings, FIGS. 1 and 2 show a tractor 10, such as a Ford [VERSATILE] Bidirectional tractor, designed to be driven with the engine 12 behind the operator 14. A vegetation cutting head 16 is attached to the tractor 10 by means of a rotatable articulated boom 18. The proximal end 20 of the boom 18 is rotatably attached to the tractor 10 near its front corner 22 so as to give the operator 14 an unobstructed view ahead and also to facilitate the breakaway operation which is described below.

Figure 3:
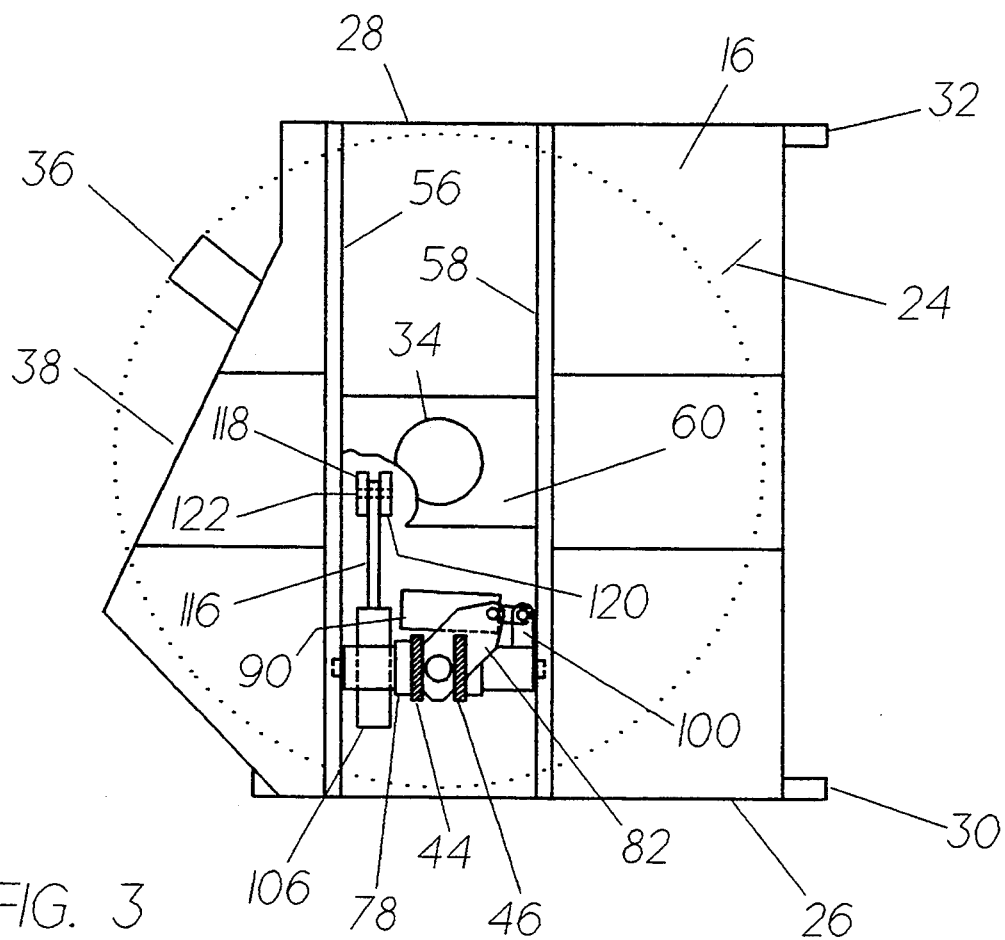
FIG. 3 is a plan view of the vegetation cutting head.
Figure 4:
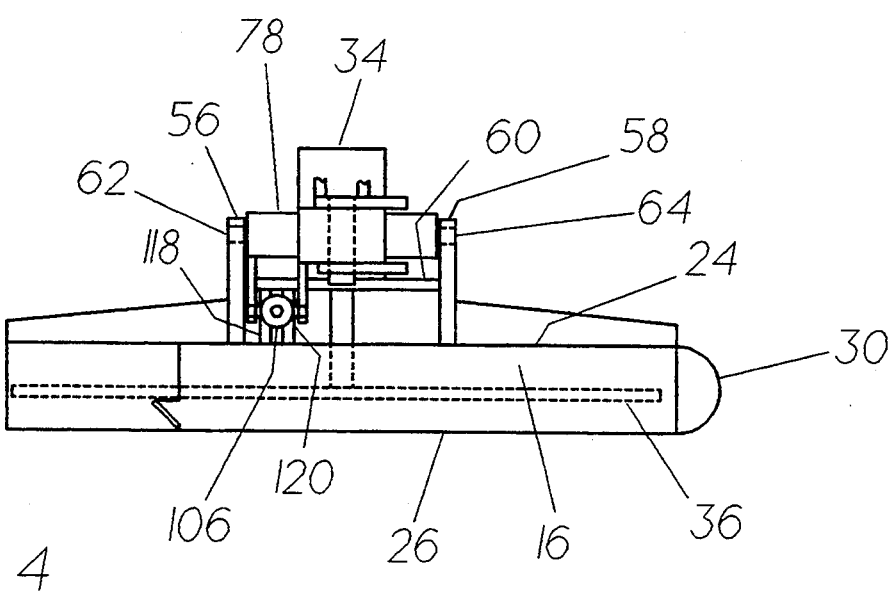
FIG. 4 is a side elevation view of the vegetation cutting head.
Figure 5:
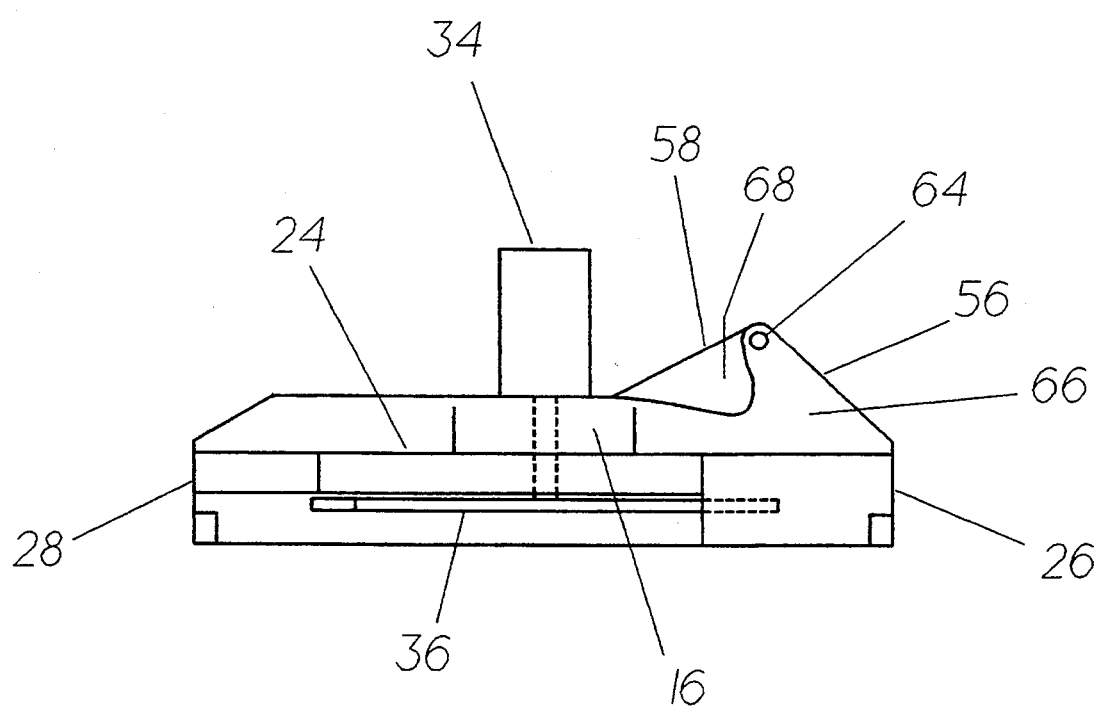
FIG. 5 is a front elevation view of the vegetation cutting head.

FIGS. 3, 4 and 5 show the cutting head 16 in greater detail. The cutting head 16 includes a deck 24 and sides 26 and 28 to which are attached skids 30 and 32. A hydraulic motor 34 is attached to the deck 24 and drives the rotating cutter blade 36. The plane of operation of the cutting head 16 is defined by the plane of rotation of the cutter blade 36 which, in the embodiment shown, is substantially parallel to the deck 24. While the deck 24 and sides 26 and 28 act as a guard for the cutter blade 36, the cutter blade 36 extends beyond the front edge 38 of the deck 24 in order to facilitate the cutting of tree branches and the like.

Figure 6:
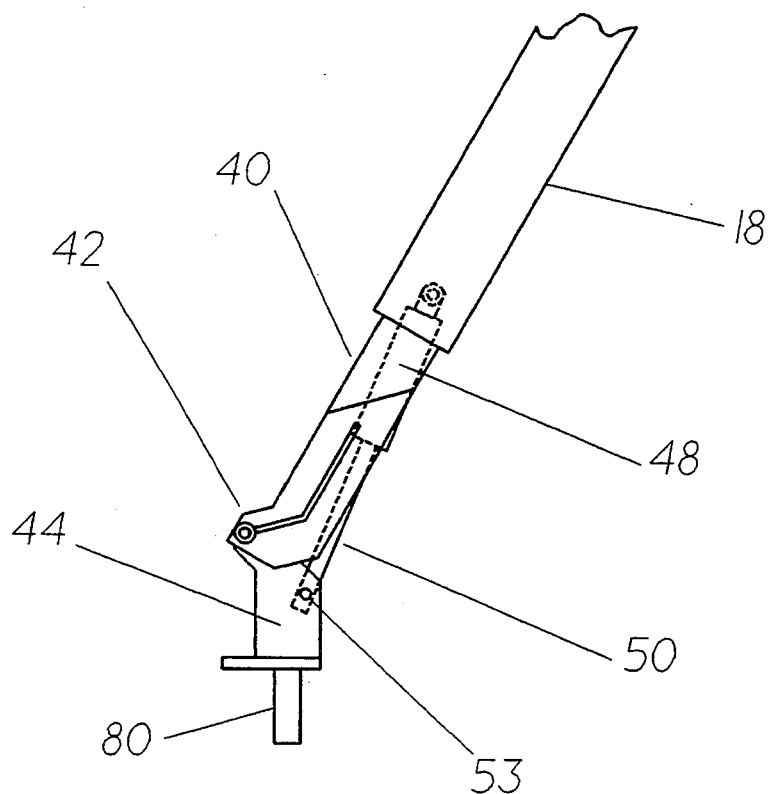
FIG. 6 is an elevation view of the distal end of the boom and a portion of the means for attaching the vegetating cutting head to it.
Figure 7:
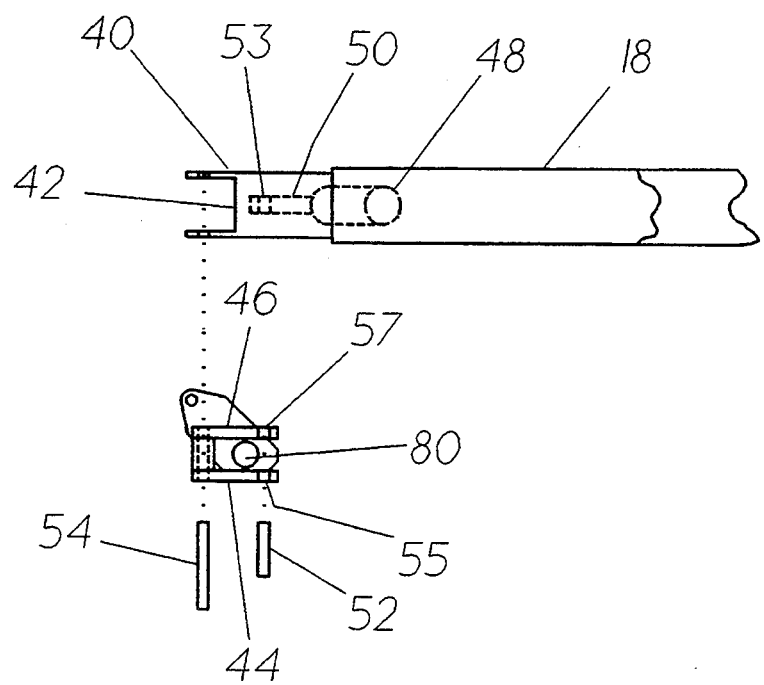
FIG. 7 is a plan view of the details shown in FIG. 6 with the attachment means offset to clarify its construction.

As is show in FIGS. 6 and 7, at the distal end 40 of the boom 18 a clevis 42 is provided which suspends two parallel plates 44 and 46 which are rotatably attached to the cutting head 16 in the manner described in more detail below. A hydraulic cylinder 48 is located in the distal end 40 of the boom 18. The piston rod 50 of the cylinder 48 is attached to the parallel plates 44 and 46 by means of a pin 52 which is disposed through the hole 53 in piston rod 50 and holes 55 and 57 in plates 44 and 46 respectively. As may be seen, activation of the hydraulic cylinder 48 will cause the cutting head 16 to rotate about the axis transverse to the distal end 40 of the boom 18 which is defined by the clevis pin 54.

Figure 8:
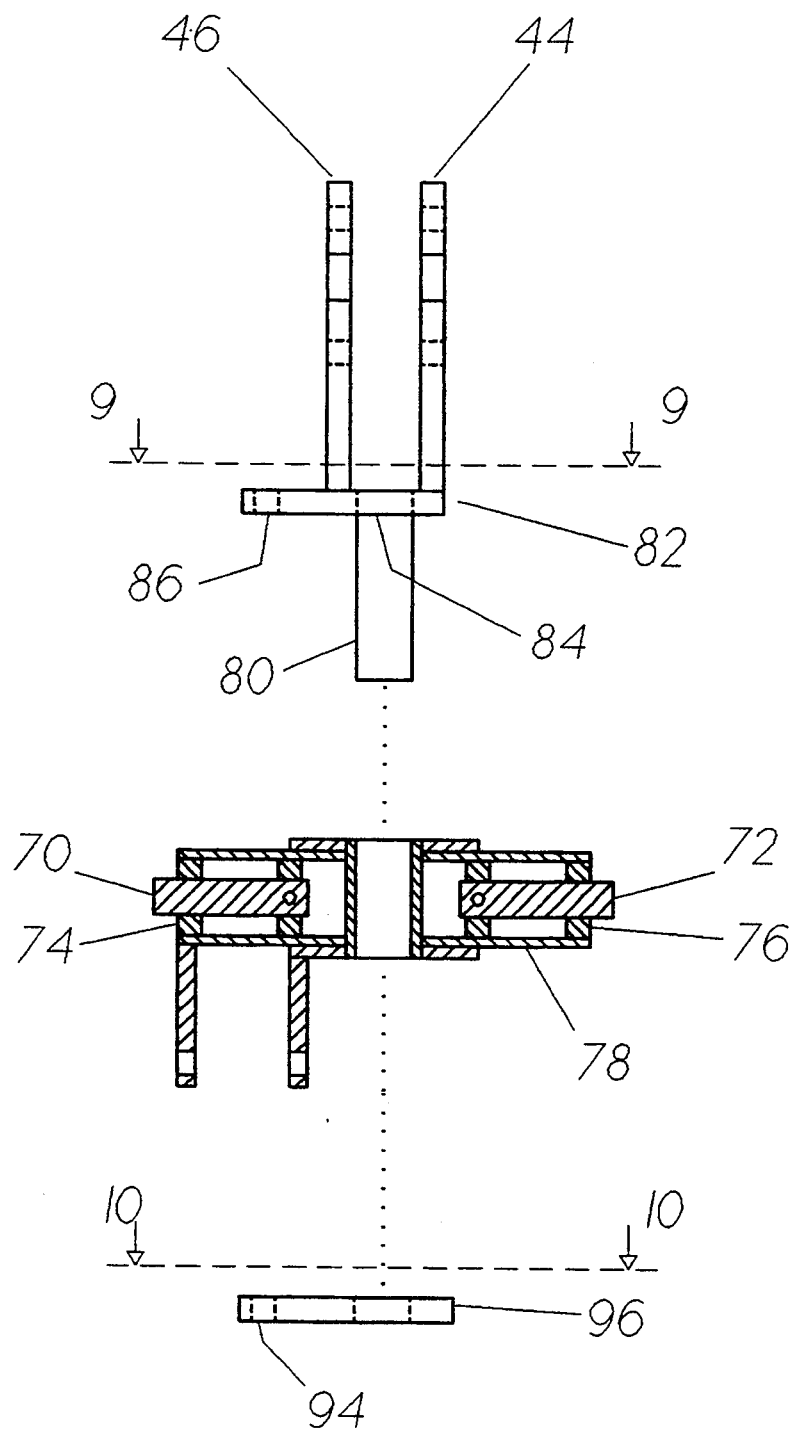
FIG. 8 is an elevation view of the box beam and trunnions from which the vegetation cutting head is suspended and of the means for attaching it to the distal end of the boom.

As is illustrated in FIGS. 3, 4 and 5, frame rails 56 and 58 are welded to the deck 24 and sides 26 and 28 of cutting head 16 and provide support therefor. A plate 60 is welded between the frame rails 56 and 58 and supports the cutter motor 34. Holes 62 and 64 in the webs 66 and 68 of frame rails 56 and 58 respectively permit the cutting head 16 to be suspended from trunnions 70 and 72 shown in FIG. 8. The trunnions 70 and 72 are comprised of pins nonrotatably secured to the opposite ends 74 and 76 of a steel box beam 78 in the manner shown.

Figure 9:
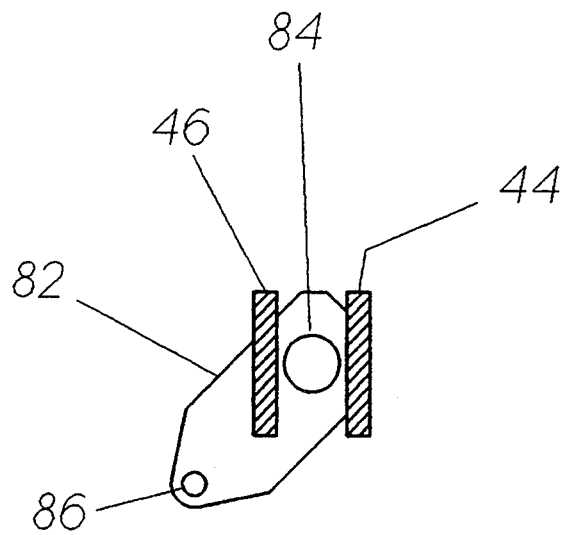
FIG. 9 is a view of the attachment means of FIG. 8 taken along the line 9—9 of FIG. 8.
Figure 10:
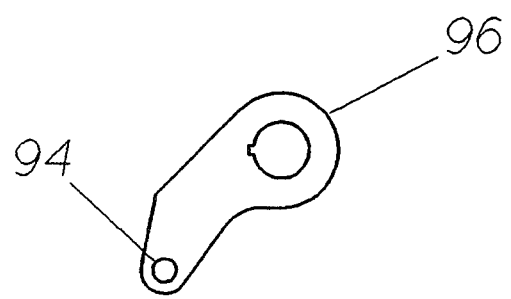
FIG. 10 is a view of the attachment means of FIG, 8 taken along the line 10—10 of FIG. 8.
Figure 11:
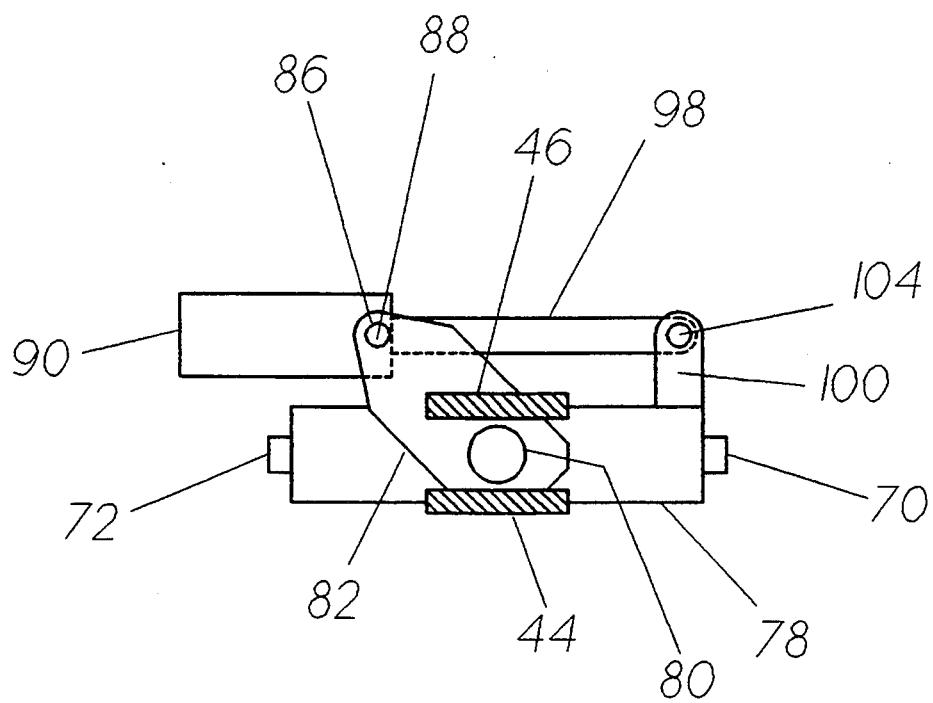
FIG. 11 is a plan view of the box beam and of the hydraulic cylinder which rotates the vegetation cutting head about the means for attachment to the boom.
Figure 12:
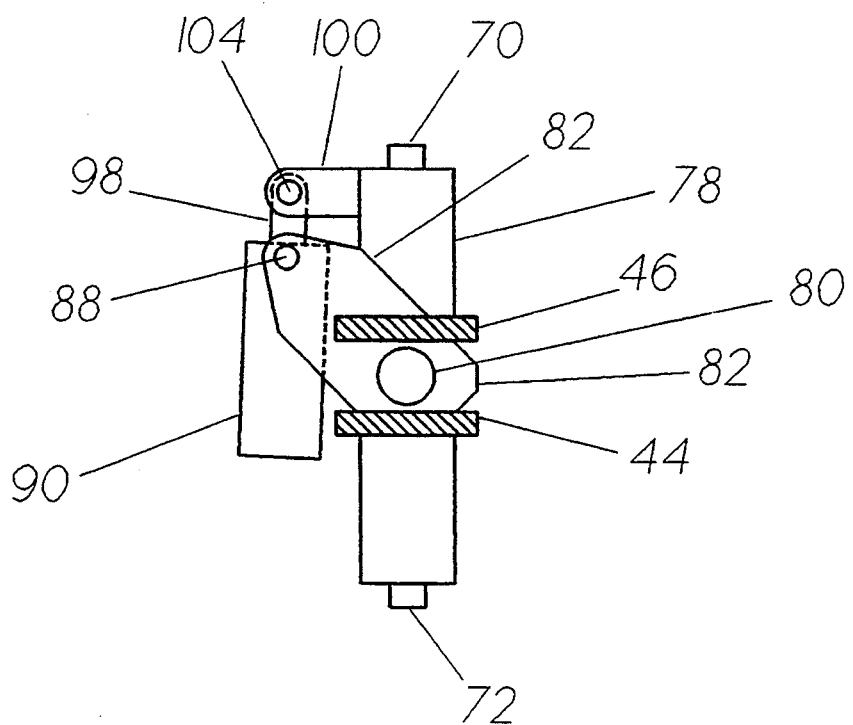
FIG. 12 is a second view of box beam and cylinder shown in FIG. 11 after operation of the cylinder has rotated the box beam through 90°.
Figure 13:
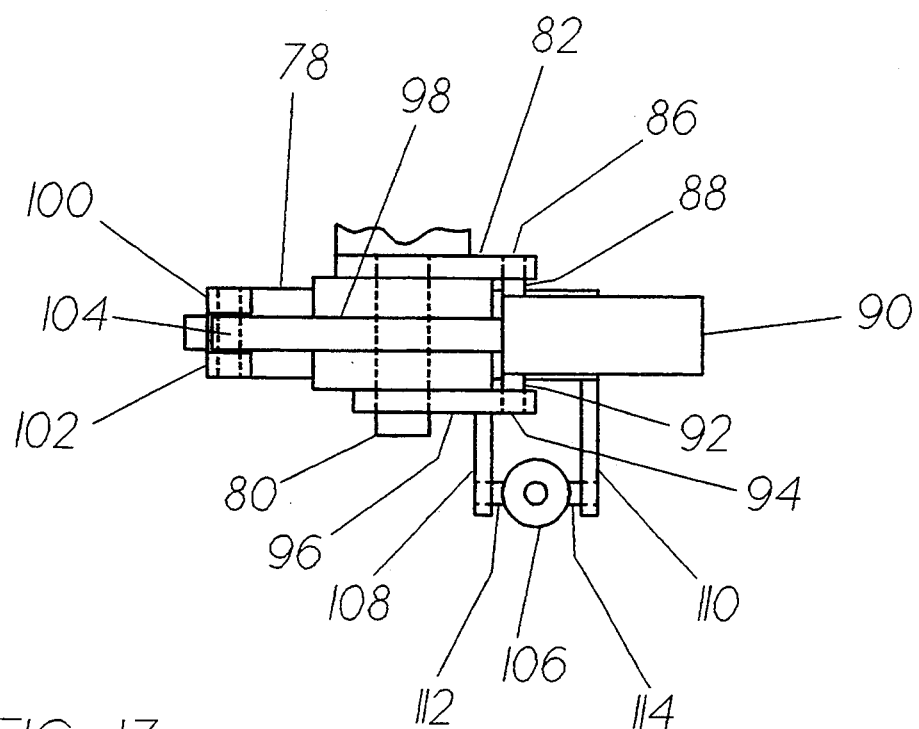
FIG. 13 is an elevation view of the box beam and cylinder of FIG. 11 also showing the cylinder which rotates the vegetation cutting head about an axis parallel to the plane of operation of the vegetation cutting head and the latter cylinder's means of attachment to the box beam.

The box beam 78 is rotatably connected to the distal end 40 of the boom 18 by a shaft 80 affixed to the parallel plates 44 and 46. A plate 82, further illustrated in FIG. 9 having a first hole 84 to accept the shaft 80 is welded to the parallel plates 44 and 46. The plate 82 is provided with a second hole 86 located such that the line between the centers of holes 84 and 86 is substantially at 45° from the plane of the parallel plates 44 and 46. The hole 86 in plate 82 (which is shown in plan view in FIG. 9) rotatably accommodates mounting pin 88 on hydraulic cylinder 90 shown in FIGS. 11 and 12. Mounting pin 92 on the opposite side of hydraulic cylinder 90 is rotatably accommodated in hole 94 in plate 96, which is fixed to shaft 80 on the side of the box beam 78 opposite plate 82. The piston rod 98 of hydraulic cylinder 90 is rotatably attached to the box beam 78 by means of flanges 100 and 102 affixed to the box beam and by pin 104 through piston rod 98 as is shown in FIGS. 11 and 13. Activation of the hydraulic cylinder 90 thus causes the box beam 78 to rotate about the axis of the shaft 80, as is illustrated in FIGS. 11 and 12. The cutting head 16, of course, rotates with the box beam 78, from which it is suspended. As may be seen, since the axis of the rotation caused by activation of hydraulic cylinder 48 and the axis of the rotation caused by the activation of hydraulic cylinder 90 are both fixed with respect to the two parallel plates 44 and 46, the two said axes of rotation are always orthogonal to each other.

Figure 14:
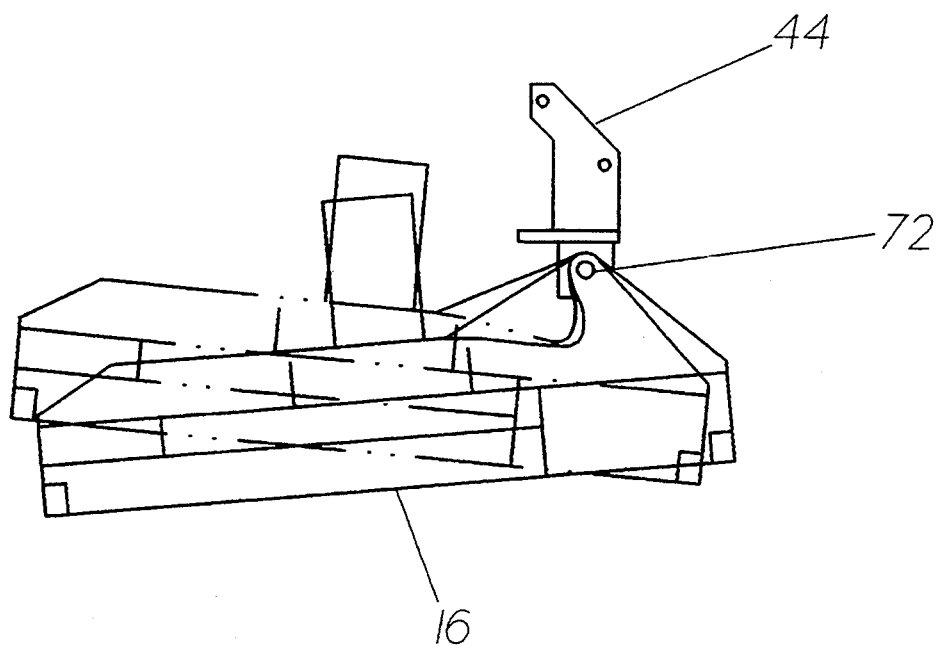
FIG. 14 is a front elevation view of the vegetation cutting head illustrating its rotation about the trunnions which define an axis parallel to the plane of operation of the vegetation cutting head.

A third hydraulic cylinder 106 is rotatably mounted on box beam 78 substantially parallel to the frame rails 56 and 58 by means of flanges 108 and 110 affixed to the box beam 78 and mounting pins 112 and 114 on hydraulic cylinder 106, as shown in FIGS. 3 and 13. The piston rod 116 of hydraulic cylinder 106 is rotatably attached to the plate 60 between the support rails 56 and 58 by means of flanges 118 and 120 affixed to the plate 60 and pin 122, through piston rod 116. Activation of the hydraulic cylinder 106 thus causes the cutting head 16 to rotate about the common axis of the two trunnions 70 and 72. Such rotation is illustrated in FIG. 14. As may be seen, the axis of this rotation is parallel to the plane of operation of the cutting head 16. As may also be seen, since the axis of the rotation caused by activation of hydraulic cylinder 90 and the axis of the rotation caused by activation of the hydraulic cylinder 106 are both fixed with respect to the box beam 78, these said two axes of rotation are always orthogonal to each other.

Figure 15:
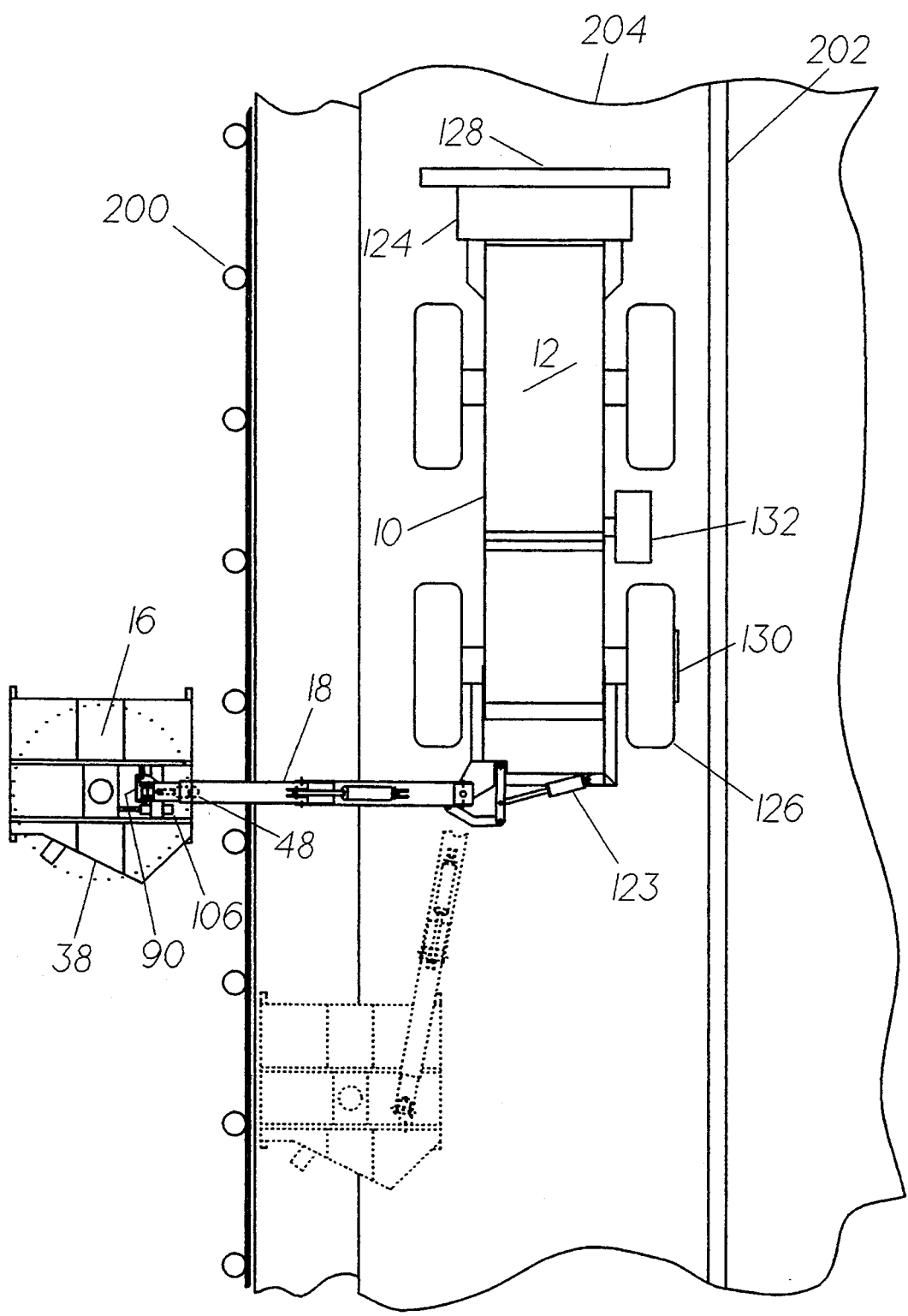
FIG. 15 is a plan view of the tractor, rotatable boom and vegetation cutting head of FIG. 1 with the boom normal to the direction of travel and, in dashed outline, with the boom in an intermediate position.

As may be seen in FIG. 1, a hydraulic cylinder 123 is provided to rotate the entire boom 18 with respect to the direction of travel of the tractor 10. The hydraulic cylinder 123 may be activated while the cutting head 16 is in operation and the tractor 10 is moving so as to rotate the boom 18 to directly in front of the tractor 10 (i.e. so that the boom 18 is parallel to the direction of travel of the tractor 10, as is illustrated in FIG. 1) or directly to the side of the tractor 10 (i.e. so that the boom 18 is at a right angle to the direction of travel of the tractor 10 as shown in FIG. 15), or to any angle between these two extremes. By activating hydraulic cylinder 90, the operator can keep the front 38 of the cutting head 16 faced to the direction of travel of the tractor 10 regardless of the angle of the boom 18 to the direction of travel. By activating hydraulic cylinder 48, or hydraulic cylinder 106, or both, the operator can rotate the cutting head 16 so as to make the plane of operation of the cutting head conform to the slope of the ground being mowed. In this regard, it should be understood that when the boom 18 is at a right angle to the direction of travel of the tractor 10 and the front 38 of the cutting head 16 is heed to the direction of travel of the tractor 10, the hydraulic cylinders 48 and 106 operate in the same plane and thus simply augment each other. With the boom 18 in this position, the mower described herein will operate similarly to a conventional articulated boom mower. With the boom 18 in any other position, activation of combinations of the hydraulic cylinders 48, 90 and 106 provides three degrees of rotational freedom for the cutting head with respect to the distal end of the boom 18. Among other advantages, this will allow mowing on either side of a guide rail 200 while the tractor 10 is kept safely to the fight of the center line 202 of the road 204, as illustrated in FIGS. 1 and 15.

I have found it desirable to have the hydraulic cylinder 123 operate at 2000 psi. At this pressure, if the cutting head 16 or boom 18 strikes an immovable object such as a tree or post the hydraulic cylinder 123 will, without activation by the operator, allow the boom to be forced to the rear without damage to the equipment. This is what is generally referred to in the art as "breakaway" action. The proximal end 20 of the boom 18 is attached to the tractor 10 at the right front corner 22 so that the operator will have time to stop the tractor 10 before breakaway action allows the boom 18 to strike and damage some part of the tractor.

I have found it desirable to locate the oil reservoir 124 for the hydraulic motor 34 and the various hydraulic cylinders referred to herein at the rear of the tractor 10 as shown in FIGS. 1 and 2 and to fill the left and front tire 126 with a solution of calcium and water while filling the other tires only with air so as to provide counterweighting for the boom 18 and cutting head 16. Depending on the relative sizes and weights of the tractor 10, boom 18 and cutting head 16, it will often also be desirable to add additional counterweight 128, 130 and 132 at the rear of the tractor 10, to the left front tire 126 and/or to the left side of the tractor 10 respectively.

Many changes and modifications in the above-described embodiment of my invention can, of course, be carried out without departing from the scope thereof.

I claim:

1. A tractor mountable mowing device comprising:
   a. a vegetation cutting head;
   b. a boom having a proximal end and a distal end;
   c. means for rotatably mounting said proximal end of said boom on a tractor;
   d. means for rotatably attaching said vegetation cutting head to said distal end of said boom;
   e. first cutting head rotating means for rotating said vegetation cutting head about an axis transverse to said distal end of said boom;
   f. second cutting head rotating means for rotating said vegetation cutting head about an axis parallel to the plane of operation of the vegetation cutting head; and
   g. third cutting head rotating means for rotating said vegetation cutting head about an axis orthogonal to said axis of rotation parallel to the plane of operation of the vegetation cutting head.

2. A device according to claim 1 wherein said axis transverse to said distal end of said boom is orthogonal to said axis of rotation parallel to the plane of operation of the vegetation cutting head.

3. A device according to claim 2 wherein there is connected to said means for rotatably mounting said proximal end of said boom on a tractor means for rotating said boom with respect to the direction of travel of the tractor while said vegetation cutting head is in operation.

4. A device according to claim 3 wherein said means for rotatably mounting said proximal end of said boom on a tractor compromises a pair of trunnions on the said axis parallel to the plane of operation of the vegetation cutting head.

5. A device according to claim 4 wherein said means for rotatably mounting said proximal end of said boom on a tractor further comprises a clevis and a clevis pin attached to the said proximal end of said boom such that the longitudinal axis of said clevis pin is on said axis transverse to said distal end of said boom.

6. A device according to claim 5 wherein said first cutting head rotating means comprises a first hydraulic cylinder, and said second cutting head rotating means comprises a second hydraulic cylinder.

7. A device according to claim 6 wherein said third cutting head rotating means comprises a third hydraulic cylinder.

8. A device according to claim 7 wherein said means for rotating said boom with respect to the direction of travel comprises a fourth hydraulic cylinder.

* * * * *